United States Patent Office 3,065,221
Patented Nov. 20, 1962

3,065,221
COPPER COMPLEX MONOAZO DYES CONTAINING A MONOHALOGENOTRIAZINYL SUBSTITUENT
Cyril Eric Vellins, Manchester, England, assignor to Imperial Chemical Industries Limited, London, England, a corporation of Great Britain
No Drawing. Filed May 13, 1959, Ser. No. 812,831
6 Claims. (Cl. 260—146)

This invention relates to new metalliferous monoazo dyestuffs. More particularly it relates to new metalliferous monoazo dyestuffs derived from cyanuric halides and valuable for the production of colourations on cellulosic textile materials, very fast to washing, to to bleach treatments and to light.

The present invention is concerned with the provision of metalliferous monoazo dyestuffs chiefly intended for the colouration of cellulosic textile materials. When applied to such materials in conjunction with a treatment with an alkali, the new monoazo dyestuffs give shades exceptionally fast to washing, to bleaching and to light.

According to the invention there are provided the new water-soluble metalliferous monoazo dyestuffs which, in the form of the free acids, are represented by the formula:

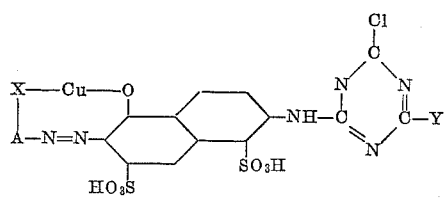

wherein:

A stands for a 1:2-phenylene group optionally substituted by chlorine, nitro, lower alkoxy, lower alkyl sulphone, sulphamyl, carboxylic acid or sulphonic acid;
X stands for —O— or —CO—O—, and
Y stands for an amino group, a methoxy group or an anilino group containing at least one sulphonic acid group.

The invention also provides a process for the manufacture of the new metalliferous monoazo dyestuffs which comprises condensing cyanuric chloride, in either order, with 1 molecular proportion of a copper-containing compound of the formula:

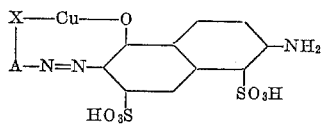

wherein A and X have the meanings given above, and with 1 molecular proportion of methanol, ammonia or a sulphonated aniline.

As examples of sulphonated anilines which may be used, there may be mentioned orthanilic acid, metanilic acid, sulphanilic acid and aniline-2:5- or 2:4-disulphonic acid.

The copper-containing compounds used in the above process may be obtained by coupling a diazonium compound of a 2-aminophenol, of an o-anisidine or of an anthranilic acid, which diazonium compound may optionally be substituted by chlorine, nitro, lower alkoxy, lower alkyl sulphone, sulphamyl, carboxylic acid or sulphonic acid, with 2-amino-5-naphthol-1:7-disulphonic acid and heating the aminoazo compound so obtained with an agent yielding copper, for example, copper sulphate.

As examples of 2-aminophenols, o-anisidines or anthranilic acids whose diazonium compounds may be used to obtain the copper-containing compounds used in the process of the invention, there may be mentioned, for example o-aminophenol, 2-aminophenol-4-sulphonic acid, 2-aminophenol-4:6-disulphonic acid, 2-aminophenol-4-ethylsulphone, 6-chloro-2-aminophenol-4-sulphonic acid, 4-chloro-2-aminophenol, 2-aminophenol-4-sulphonamide, 4-methylsulphamyl-2-aminophenol, o-anisidine, 4-chloro-2-aminoanisole, 2:5-dimethoxyaniline, aminoterephthalic acid, 4-amino-iso-phthalic acid, 4-chloro-2-aminophenol-6-sulphonic acid, 2-aminoanisole-4-sulphonic acid, 1-amino-2-carboxybenzene, 2-amino-4-sulphobenzoic acid, 2-amino-5-sulphobenzoic acid and 4-chloro-2-aminobenzoic acid.

The process of the invention is preferably carried out in an aqueous medium at as low a temperature as possible, preferably below 50° C., and advantageously in a neutral or weakly acid solution in the presence of an acid binding agent preferably sodium carbonate or bicarbonate.

In a further feature of the invention, the new metalliferous monoazo dyestuffs may be obtained by a modified process wherein a water-soluble metal free monoazo compound of the formula:

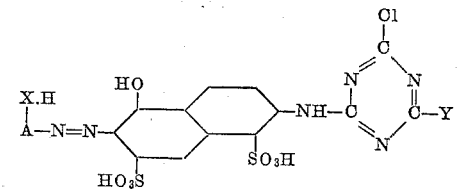

wherein A, X and Y have the meanings stated above, is heated in aqueous solution with an agent yielding copper.

The metal-free monoazo compounds used in this modified process may be obtained by a number of methods, for example by condensing cyanuric chloride with one molecular proportion of a metal-free monoazo compound of the formula:

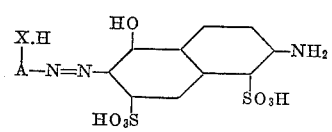

wherein A and X have the meanings given above, and with one molecular proportion of ammonia, methanol or a sulphonated aniline; or by coupling the diazonium compound of a 2-aminophenol or an anthranilic acid which diazonium compound may optionally be substituted by chlorine, nitro, lower alkoxy, lower alkyl sulphone, sulphamyl, carboxylic acid or sulphonic acid, with a 2-(2'-chloro - 4' - Y - s - triazinylamino) - 5 - naphthol - 1:7-disulphonic acid wherein Y has the meaning given above.

The treatment with the metal-yielding agent must be carried out under such conditions that the halogen atom still attached to the s-triazine ring is not removed during the treatment. Thus the modified process may be carried out for example by stirring the metal-yielding agent and the metal-free monoazo compound containing the monohalogeno-s-triazinyl group in a weakly acidic aqueous medium preferably keeping the temperature below 50° C.

The new metalliferous monoazo dyestuffs in the form of the alkali metal salts are soluble in water and are preferably used to colour silk, wool, regenerated protein and cellulosic textile materials for example cotton, linen and viscose rayon, by treating the textile material with an aqueous solution (which may be a thickened printing paste) of the dyestuff in conjunction with a treatment with an alkaline agent, for example sodium hydroxide, potassium phosphate, sodium bicarbonate or sodium carbonate. The treatment with the alkaline agent may be carried out prior to, simultaneously with or after the treatment with the dyestuff.

The new dyestuffs may also be applied to silk, wool, regenerated protein, polyamide, and modified polyacrylonitrile textile materials, by the conventional dyeing methods used for those textile materials, that is by dyeing from weakly acid or neutral dyestuff solutions, for example dyestuff solutions containing acetic acid, formic acid, sodium sulphate or ammonium acetate.

The dyestuffs may also be applied to silk, wool and regenerated protein textile materials by the conventional printing methods used for those materials.

The new metalliferous monoazo dyestuffs are particularly valuable for application to cellulosic textile materials in accordance with the printing process described in Belgian specification No. 543,218, since they have a much higher stability in the printing paste than the dyestuffs disclosed in that specification. They give a wide variety of level shades, very fast to washing, to bleach treatments and to light. The amount of dyestuff fixed on the fibre is unusually high.

The invention is illustrated but not limited by the following example (in which parts are by weight) and table:

*Example 1*

A solution of 25 parts of metanilic acid in 100 parts of water is neutralised to pH 7 and added to a solution of 122 parts of the trisodium salt of the copper complex of 2-(2':4'-dichloro-s-triazinylamino)-6-(2''-hydroxyphenylazo)-5-naphthol-1:5'':7-trisulphonic acid (obtained as described below) in 900 parts of water.

The mixture is heated at 30 to 35° C. for 30 minutes, sodium carbonate being added periodically to keep the pH of the mixture at about 7. 120 parts of sodium chloride are then added and the precipitated dyestuff is filtered off and dried.

The product so obtained dyes cellulose in bluish red shades very fast to washing and to light and of surprisingly high fastness to bleach treatments.

The copper complex of 2-(2':4'-dichloro-s-triazinylamino) - 6 - (2''-hydroxyphenylazo)-5-naphthol-1:5'':7-trisulphonic acid used in the above example may be obtained by coupling diazotised 2-aminophenol-4-sulphonic acid with 2-amino-5-naphthol-1:7-disulphonic acid, heating the aminoazo compound so obtained with an aqueous solution of copper sulphate, and condensing the resultant copper complex with 1 molecular proportion of cyanuric chloride.

In the following table, the shades of other dyestuffs of the invention are described. These dyestuffs all give shades having the characteristic fastness to washing, light and bleach treatments when applied to cellulose in conjunction with an acid-binding agent. They are obtained by condensing cyanuric chloride with the compound named in column 2 and with the copper complex of the aminoazo compound formed by coupling a diazonium compound of the amine named in column 1 with 2-amino-5-naphthol-1:7-disulphonic acid.

| Diazotised amine | Compound | Shade |
|---|---|---|
| (2) 4-chloro-2-aminophenol-6-sulphonic acid. | ammonia | helio. |
| (3) 4:5-dichloro-2-aminophenol-6-sulphonic acid. | orthanilic acid | violet. |
| (4) 5-nitro-2-aminophenol | aniline-2:5-disulphonic acid. | blue-violet. |
| (5) 5-sulpho-2-aminobenzoic acid | methanol | orange-brown. |
| (6) 3-nitro-2-aminobenzoic acid | sulphanilic acid | red-brown. |
| (7) 4-sulpho-2-aminobenzoic acid | metanilic acid | orange-brown. |

These dyestuffs just described have, respectively, the following structural formulae:

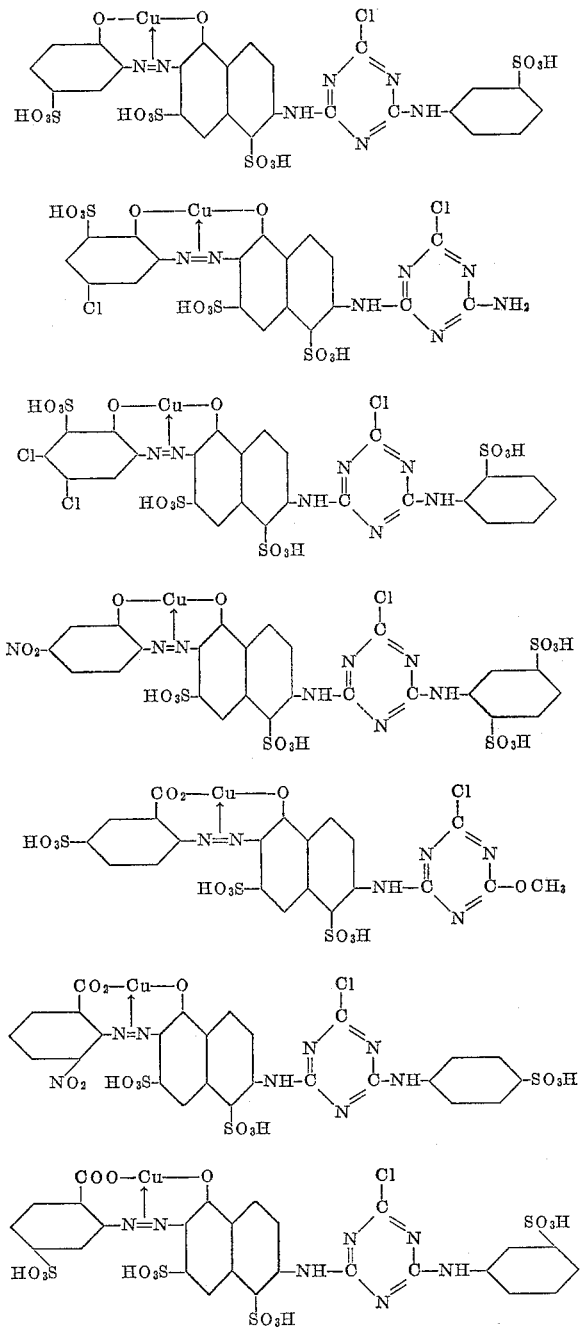

What I claim is:
1. The water-soluble monoazo dyestuffs which, in the form of the free acids, are represented by the formula:

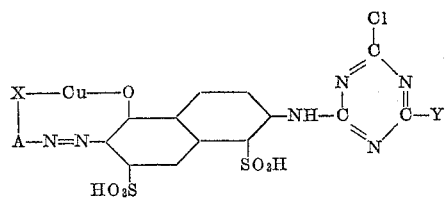

wherein:
A stands for a 1:2-phenylene group substituted by members selected from the group consisting of chlorine, nitro, lower alkoxy, lower alkyl sulphone, sulphamyl, carboxylic acid and sulphonic acid, X stands for a radical selected from the group consisting of —O— and —CO—O—, and Y stands for a member selected from the group consisting of amino group, methoxy group and an anilino group containing at least one sulphonic acid group.

2. The dyestuff which in the acid form is represented by the formula:

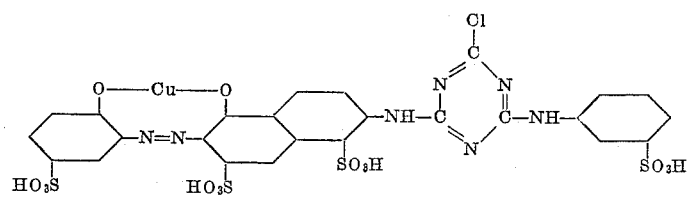

3. The dyestuff which in the acid form is represented by the formula:

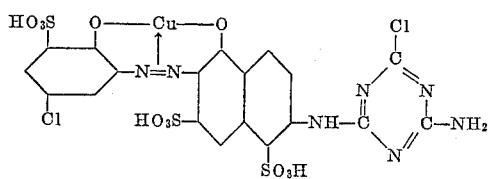

4. The dyestuff which in the acid form is represented by the formula:

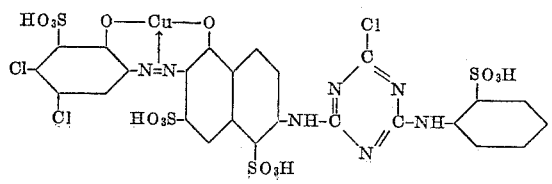

5. The dyestuff which in the acid form is represented by the formula:

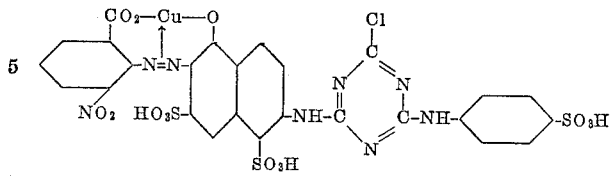

6. The dyestuff which in the acid form is represented by the formula:

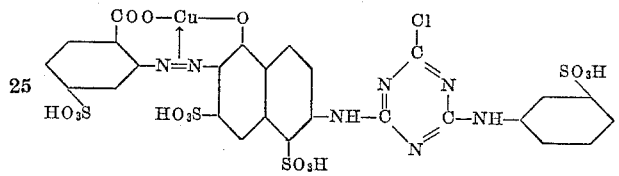

References Cited in the file of this patent

UNITED STATES PATENTS

| | | |
|---|---|---|
| 1,865,978 | Straub et al. | July 5, 1932 |
| 2,873,269 | Fasciati et al. | Feb. 10, 1959 |
| 2,929,809 | Menzi et al. | Mar. 22, 1960 |

FOREIGN PATENTS

| | | |
|---|---|---|
| 138,226 | Switzerland | May 1, 1930 |

OTHER REFERENCES

Colour Index, 2nd edition, vol. 3 (1956), p. 3734.